Feb. 16, 1932.  T. S. COLE  1,845,483
BATTERY RECORDER
Filed Nov. 9, 1928
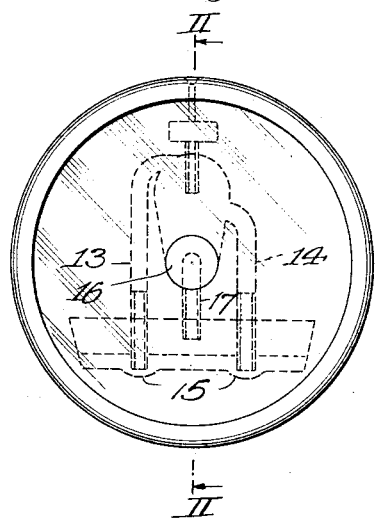
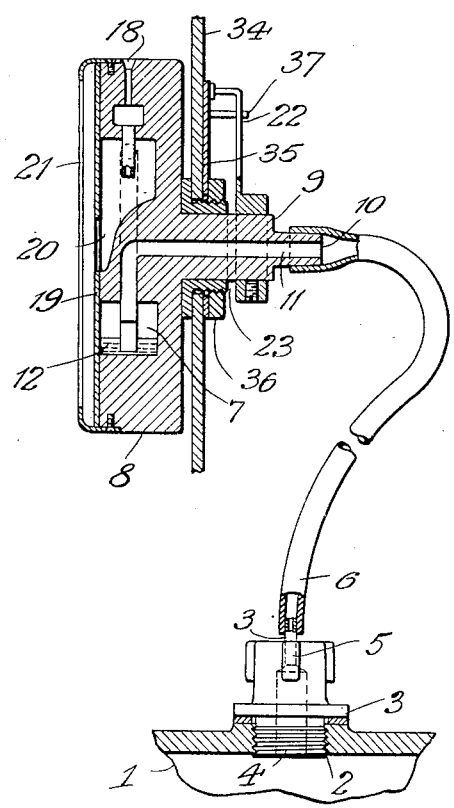
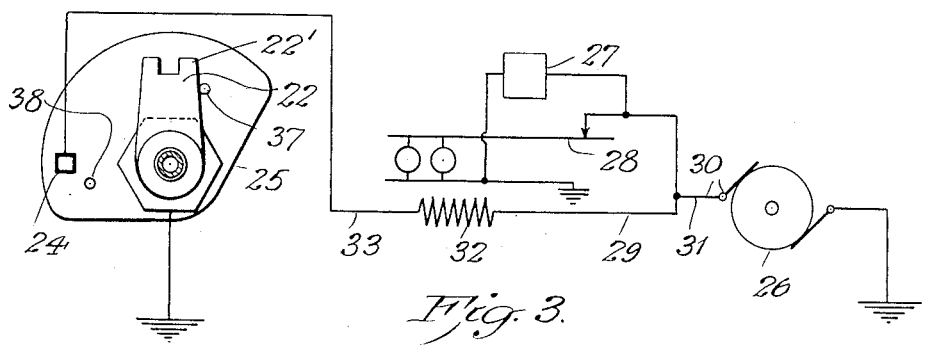
INVENTOR
Theodore S. Cole
BY
ATTORNEY Patented Feb. 16, 1932

1,845,483

UNITED STATES PATENT OFFICE

THEODORE S. COLE, OF NEW HAVEN, CONNECTICUT

BATTERY RECORDER

Application filed November 9, 1928. Serial No. 318,167.

This invention relates to batteries, particularly to storage batteries, and more especially to that type of storage battery which, "gases," upon being fully charged, and has particular reference to a means and method for ascertaining and recording whether or not a battery of the type specified has been fully charged.

It is well known to those skilled in the storage battery art that at the present day an enormous number of storage batteries are being used by people very little, if at all, familiar with the scientific principles underlying the construction, operation and maintenance of storage batteries, and consequently, not at all competent to properly care for such batteries unless provided with appliances of such a simple nature and of such positive indication as will absolutely preclude the opportunity of taking an improper action.

It is also well known that a large number of storage batteries are in use at the present day which are charged by a fixed current. This method has been adopted probably because of the inabiliy of the average user to successfully determine the proper charge rate of a given battery with the appliances ordinarily at his command. The result of this fixed current charging, or charging from a constant current generator, has resulted, especially in the case of storage batteries as used upon automobiles for starting and lighting, in having the battery overcharged or in having it undercharged. This arises from the fact that ordinarily a storage battery on a pleasure automobile is overcharged by summer driving but undercharged by winter driving, because in summer the lights are not used, ordinarily, anywhere near as much as in winter and in summer the automatic starter does not draw as great a current from the battery when starting the motor as in winter.

A long overcharge deteriorates a battery because it causes the positive plate to erode and deposit as a sediment in the bottom of the battery cell. This sediment causes a partial short circuit which, of course, is a constant drain upon the battery and is cumulative in that it causes further disintegration of the positive plate.

An undercharged battery deteriorates, if used, by the sulfating of the negative plates.

Although many of the difficulties above pointed out have been learned by sad experience by the every day user of storage batteries, nevertheless the difficulty has continued, because, especially in the case of the automobile, the storage battery is generally placed in a most inaccessible position. In order to reach it it is necessary, generally, to remove floor boards or seats. The average user is adverse to taking too much trouble. Even if the battery is reached it is necessary to test it with a hydrometer or by a voltage reading or by the dead short circuit test. The average user is not skilled in the use of a hydrometer and consequently really derives very little information from its use. The voltage reading is unreliable. The dead short circuit test is probably equally unreliable and, further, if not used by a skilled person may actually cause an injury to the battery as, for instance, by a buckling of the plates.

It is a purpose of this invention to provide a means by which the ordinary user of a battery may be enabled to determine the condition of that battery at a distance from the battery in a manner, which might be said to be one, befitting a gentleman.

It is an object of this invention to provide a device usable in any ordinary situation by any ordinary individual whereby the condition of a storage battery may be readily and reliably determined.

A further object of this invention is to provide a device comprising a minimum of moving parts and entirely devoid of troublesome valves.

It is a further object of this invention to provide a device which may be so easily installed upon the ordinary automobile that it may be actually installed by the average person not at all skilled in such matters.

It is a further object of this invention to provide a device of the type specified in which the indication or record will be so comprehensible and intelligible to the ordinary person that no involved mental effort will be necessary to determine the proper action to take in view of the record or indication.

A further object of this invention is to provide a recorder or indicating device which, if used and its indicatures obeyed will result in a longer life of the battery and more satisfactory service.

It is a further object of this invention to provide a device whereby its use will enable a higher average charging current to be used.

A further object of the invention is to provide a recording device of the type specified which will not only properly indicate and record the condition of full charge but will also function to indicate the existence of partial short circuits within the battery.

In accordance with this invention the fully charged condition of a battery of the closed type which gases upon being fully charged is determined by utilizing the gaseous pressure generated by that battery. It is preferred to do this by displacing a body in such a manner as to become apparent to the user of the battery and further to provide a means whereby a replacement of the displaceable body by the user of the battery will simultaneously operate to reduce the charging rate of the battery or entirely interrupt the charging thereof.

Other objects and advantages and a more particular knowledge of the invention will appear as the description of a particular physical embodiment selected to illustrate the invention progresses, and the novel features of the invention will be particularly pointed out in the appended claims.

In describing the invention in detail and the particular physical embodiment selected to illustrate the invention, reference is had to the accompanying drawings, wherein has been illustrated a particular preferred physical embodiment of the invention, and wherein like characters of reference designates corresponding parts throughout the several views, and in which:

Fig. 1 is a front elevational view of a device embodying the invention, with certain hidden parts illustrated by dotted lines;

Fig. 2 is a cross sectional elevational view on the plane indicated by the dotted line II—II of Fig. 1, viewed in the direction of the arrows at the ends of the line;

Fig. 3 is a partial rear elevational view of the device as shown by Fig. 1 combined with a diagram illustrating a charging circuit and a battery.

In Fig. 2, a part of battery 1 is diagrammatically illustrated. This battery is considered to be of the type which is closed, i. e. the active elements, the electrolyte and the electrodes, are positioned within a chamber closed except for an orifice 2 at the top which in ordinary practice receives the well known vent cap or filler cap but which in applicant's combination receives the conducting nipple 3.

The ordinary storage battery of the type illustrated having an aqueous solution of sulphuric acid as an electrolyte and lead plates properly formed will, upon being fully charged, generate hydrogen gas. This hydrogen gas will build up a gaseous pressure within the cell which in applicant's combination is conducted by cavity 4 and duct 5 to a conduit 6. This conduit 6 may be of any desired or appropriate form but it is preferred to have it of flexible material and made in the form of the ordinary and well known rubber tubing, as such construction facilitates the appropriate connection from the nipple 3 to the device embodying this invention as illustrated in Fig. 2 and which in practice is preferably positioned visible to the user of the battery. If the battery is one being used upon an automobile a preferred position for the device of Fig. 2 would be upon the dashboard.

The body upon which the gaseous pressure will exert its influence is a fluid body. By selecting a fluid, it is not intended to exclude the use of other and appropriate bodies, fluid or otherwise. It is also preferable to use ordinary mercury as the fluid, although by so selecting mercury it is not intended to exclude the use of other and appropriate fluids well known.

In order to contain the fluid mercury used there has been provided a receptacle 7. This receptacle, which in the form shown, may also be called a chamber, is formed as a cavity in a body 8. The body 8 may be formed of any suitable or appropriate material preferably selecting an electrical insulating material which is not acted upon by mercury and which does not deleteriously affect mercury. An appropriate material for such purpose would be hard rubber or any of the phenolic condensation products now so commonly used for the insulating parts of the electrical devices connected with automobiles.

The body 8 in the particular form shown is considered to be made of a phenolic condensation product and has a rearwardly extending hub 9 which is cylindrical in cross section and is suitably reduced on its extreme end 10 to form a conical nipple or flexible tube receiving end and is, in the form shown, provided with a passage 11 which extends therethrough and terminates in the receptacle of chamber 7.

The body of mercury 12 within the chamber 7 is such that the top surface thereof is always below the lower end of the conduit 11.

By the construction hereinbefore described the gaseous pressure generated by the battery 1 conducted by tube 6 and duct 11 is exerted upon the body of mercury 12 in the receptacle 7 and thus the body of mercury is forced into the ducts or conduits 13 and 14 as best shown in Fig. 1. These conduits or ducts 13 and 14, in the form shown, are formed integral with the body 8 and terminate below the top surface of the body of mercury 12 in the chamber 7. In fact, it is preferable to make small sumps 15 in the chamber 7 and have the ducts 13 and 14 both extend slightly down into these sumps so that full use may be made of every drop of mercury within the chamber 7. The lower ends of the ducts 13 and 14 are preferably positioned substantially in the same horizontal plane so that all of the mercury in the chamber 7 when subjected to gaseous pressure will be forced into the ducts before either is uncovered so as to allow the gas to flow directly through either duct.

The ducts 13 and 14 connect with and terminate in what may be called a receptacle or chamber 16, best shown in Fig. 1. The ducts preferably terminate on substantially opposite sides of the chamber 16 and at a substantial distance above the lower surface 17 of the chamber. The result of this construction is that when the mercury is forced through either one or both of the ducts 13 and 14 it will flow out of the upper ends of said ducts and deposit in the chamber 16 and in the lower part of said chamber resting on the bottom 17 and with its top surface just below the lower surface of the opening of the lowest duct, i. e., the chamber 16 below the ducts is sufficient to contain all of the mercury which is placed in the chamber or receptacle 7 and is forced through the ducts.

After all of the mercury has been transferred to the chamber 16, the gas, the pressure of which forced the mercury into chamber 16, may then flow directly through the ducts 13 or 14, or both, without bubbling through the mercury, and reaching the chamber 16 above the body of mercury therein will flow to the top thereof and may then by means of the vent opening or duct 18 pass to atmosphere.

By more particular reference to Fig. 2 it will be seen that the particular form of body 8, which has been selected for illustration, has a cover member 19 which entirely covers chamber or receptacle 7 and so acts really as a part of body 8 to form the chamber or receptacle 7 and also that the member 19 acts to partly cover the chamber 16 but is so formed that the lower portion 20 of chamber 16 is not covered, there being what might be considered a small circular opening, as best shown in Fig. 1. Outside of the cover 19 is a glass plate 21 which bears tightly against the cover 19 thus providing a transparent member through which mercury in the lower portion 20 of chamber 16 may be observed. As the mercury in the lower portion 20 of chamber 16 is the indication that the battery has generated gaseous pressure it is therefore fully charged and as this mercury is visible and remains there after being forced thereto, the recorder might be called a visible indicator or recorder, but it is to be understood that although he prefers to make his indicator or recorder in the visible form, that, nevertheless, the transference of mercury from the lower chamber 7 to the upper chamber 16 may be made apparent to the senses of the user by means other than a visible indication by the use of the well known instrumentalities which appeal to the senses other than that of sight and for the purposes of this case it is considered that such other methods are included within the term "visible."

After the mercury has been transferred, as hereinbefore described, to the upper chamber 16 the user, of course, desires to either entirely stop the charging of the battery or to reduce the charging rate. There is provided means by which this may be done and there is illustrated particularly the means for reducing the charging rate, it being evident that to entirely interrupt the charge could be accomplished in a substantially similar manner and within the skill of those acquainted with this art.

In order to reduce the charging rate there is provided a contact finger 22 supported by the boss 9 and rotatable or oscillatable therewith. In order to properly manipulate this finger the boss is mounted within the sleeve 23 so that the boss will act as a bearing upon which the member 8 may be partially rotated or oscillated. In the path of the contact finger 22 is positioned a conducting contact 24, best shown in Fig. 3. The conducting contact 24 is mounted insulatingly upon the metallic segment 25, i. e., 24 is insulated from 25. When the hub 9 is oscillated clockwise, as shown by Fig. 1, but counter-clockwise as shown by Fig. 3, the contact finger 22 contacts with conducting contact 24 and thus forms a low resistance shunt around the battery 1, as best shown in Fig. 3, so that the charging rate of the battery is reduced. A charging generator 26, the ordinary cutout 27, and the contact thereof 28, are shown diagrammatically so as to show that the shunt 29 is connected between the generator and the cutout and battery. The circuit of the shunt is from the upper terminal 30 of the generator 26 by wires 31 and 29 to a suitable resistance 32, thence by wire 33 to the conducting contact 24 and then by contact finger 22 by means of the second prong thereof, designated 22', to the segment 25, from the segment 25 to ground and back to the other side of the generator.

In order to properly position the sleeve 23 so as to properly hold the several parts, it is preferable to pass the sleeve through an orifice in the dash of an automobile. This dash is designated, in Fig. 2, by 34 and the sleeve is retained in the orifice thereof by virtue of the shoulder 35 bearing against one side of the dash and the segment 25 bearing against the other side together with the nut 36 threaded upon the outer screw threaded periphery of the sleeve 23 firmly in contact with segment 25 so that the sleeve is firmly held in position upon the dash 34.

The oscillation of the body 8 in a clockwise direction, as viewed in Fig. 1, will also cause the mercury in chamber or receptacle 16 to flow back through conduit 14 to chamber or receptacle 7.

When it is desired to resume full charging rate the body 8 is manually oscillated to its original position, that is, the position as shown in Fig. 1.

The angle through which the body 8 is to be turned to accomplish the results above indicated may be any substantial angle desired if all parts are proportioned and arranged properly. A 90 degree angle is illustrated as, with the particular form shown, the entire contents of chamber 16 will flow into duct 14 upon a 90 degree movement of body 8 in a clockwise direction, as shown in Fig. 1. To determine the actual angle of movement, as a matter of convenience, the pin stops 37 and 38 in segments 25 are provided.

Although the receptacle 7 and receptacle 16 have been described as being formed in one body 8, it is to be understood that such method of construction is not intended to exclude entirely separate receptacles mounted upon a common member but not formed within the common member.

Although in practice the two ducts 13 and 14 may open within the chamber 16 upon substantially the same horizontal plane, it being merely sufficient that their openings are so positioned that when the body 8 is oscillated upon the hub 9 that one opening will be depressed while the other is elevated, nevertheless, it is preferred to extend one of the ducts as 13 so that it will open at a higher plane than the opening of duct 14 so as to more certainly provide a clear passage for the gas of the battery from chamber or receptacle 7 to chamber 16 and vent 18 when the device has been rotated clockwise as viewed in Fig. 1 to decrease the charging rate or interrupt the charging of the battery and also to provide that all of the mercury will first be forced through duct 14 before gas passes into duct 13. Such construction also better provides against an air lock preventing return of the mercury.

By reason of the control had by the use of this invention a higher charging rate may be employed thereby benefiting the battery or cell.

If a battery of the type specified not being charged has partial short circuits therein it will gas, consequently an indication of gasing by applicant's device when the battery is not being charged, as for instance, at the moment of high output as in starting an automobile will indicate the existence of partial short circuits.

A partially shorted battery, on charging at the usual rate for an adequate time will not gas to the extent a battery in good condition will, consequently, applicant's invention when used may also indicate a partial short circuit by failure to gas on charging.

Although there has been particularly described the construction of one physical embodiment of the invention and the operation and principles thereof explained, nevertheless, it is desired to have it understood that the form selected is merely illustrative, but does not exhaust the possible physical embodiments of the idea of means underlying the invention.

What I claim as new and desire to secure by Letters Patent of the United States, is:

1. In a recorder for a closed battery which gases when fully charged, in combination: a receptacle formed with two outlets, one of said outlets being in a higher plane than the other; a second receptacle; a body of fluid in the second receptacle; a conduit connecting with the said outlet not on the higher plane, which conduit extends below the top of the fluid in the said second receptacle; a conduit connecting with the said higher outlet which also extends at least as far below the top of the fluid in the second receptacle as does the first said conduit; means connecting the second receptacle above the fluid therein with the closed battery and a vent to atmosphere from the first said receptacle whereby when the battery gases some of the fluid is forced into the second receptacle sufficient to uncover the end of at least one of the conduits and then may escape through the first said conduit, first receptacle and vent to atmosphere; means for manually tipping the first receptacle whereby the said fluid may be returned to the second receptacle which is meanwhile vented by the second mentioned conduit.

2. In a recorder for a closed battery which gases when fully charged, in combination: a body having formed therein, two chambers, one higher than the other; a body of fluid in the lower chamber; two conduits connecting the chambers, each conduit extending a substantially equal distance below the top of the fluid in the lower chamber, and the conduits opening into the upper chamber at substantially opposite sides thereof and a substantial distance above the bottom thereof; means for venting the upper chamber to atmosphere; means for connecting the lower chamber above the fluid therein to the closed battery and means forming a pivot upon which the body may be oscillated in a vertical plane.

3. In a recorder for a closed battery which gases when fully charged, in combination: a body having formed therein, two chambers, one higher than the other; a body of fluid in the lower chamber; two conduits connecting the chambers, each conduit extending a substantially equal distance below the top of the fluid in the lower chamber, and the conduits opening into the upper chamber at substantially opposite sides thereof and a substantial distance above the bottom thereof; means for venting the upper chamber to atmosphere; means for connecting the lower chamber above the fluid therein to the closed battery and means forming a pivot upon which the body may be oscillated in a vertical plane substantially at a right angle to the vertical plane passing substantially midway between the openings of the conduits into the upper chamber.

4. In a recorder for a closed battery which gases when fully charged, in combination: a body formed with chambers; a fluid in one of said chambers, means including gaseous pressure generated by the battery for transferring the fluid to the other chamber and means operated manually for transferring back the fluid to the original chamber.

5. A recorder for a closed battery which gases when fully charged comprising a displaceable body adapted to be displaced by the pressure of the gases generated by the battery, and means for retaining the body in the displaced position.

6. A recorder for a closed battery which gases when fully charged comprising a displaceable body adapted to be displaced by the pressure of the gases generated by the battery, means for retaining the body in the displaced position, and means for returning the displaceable body to its original position.

7. A recorder for a closed battery which gases when fully charged comprising a displaceable body adapted to be displaced by the pressure of the gases generated by the battery, means for retaining the body in the displaced position and manually operable means for returning the displaceable body to its original position.

8. A recorder for a closed battery which gases when fully charged comprising a casing having receptacles therein, and a displaceable body adapted to be displaced from one receptacle to another by the pressure of the gases generated by the battery.

9. A recorder for a closed battery which gases when fully charged comprising a casing having receptacles therein, a displaceable body adapted to be displaced from one receptacle to another by the pressure of the gases generated by the battery and means for returning the displaceable body to its original position, and means for providing a free vent to the atmosphere for the gases.

10. A recorder for a closed battery which gases when fully charged comprising a casing having two receptacles therein, one of said receptacles being elevated with respect to the other and communicating therewith, a displaceable body within the lower receptacle adapted to be forced into the upper receptacle by the pressure of the gases generated by the battery, and means for placing the lower receptacle in communication with the battery.

11. A recorder for a closed battery which gases when fully charged comprising a casing having two receptacles therein, one of said receptacles being elevated with respect to the other, a fluid body in the lower receptacle, and a conduit connecting the two receptacles, the conduit extending substantially to the bottom of the fluid in the lower receptacle and communicating with the upper receptacle above the bottom thereof, said casing having an opening therethrough above the fluid in the lower receptacle for connecting the recorder to a battery.

12. A recorder for a closed battery which gases when fully charged comprising a casing having two receptacles therein, one of said receptacles being elevated with respect to the other, a fluid body in the lower receptacle, a conduit connecting the two receptacles, the conduit extending substantially to the bottom of the fluid in the lower receptacle and communicating with the upper receptacle above the bottom thereof, said casing having an opening therethrough above the fluid in the lower receptacle for connecting the recorder to a battery, and means for providing a free vent to the atmosphere to permit the free passage of the fluid body from the upper to the lower chamber.

13. A recorder for a closed battery which gases when fully charged comprising, a casing having two receptacles therein, one of said receptacles being elevated with respect to the other, a fluid body in the lower receptacle, a conduit connecting the two receptacles, the conduit extending substantially to the bottom of the fluid in the lower receptacle and communicating with the upper receptacle above the bottom thereof, said casing having an opening therethrough above the fluid in the lower receptacle for connecting the recorder to the battery, and manually operable means for returning the fluid body from the upper to the lower receptacle including means for providing a free vent to the atmosphere for the gases.

In witness whereof, I hereunto subscribe my signature.

THEODORE S. COLE.